United States Patent [19]

Wada et al.

[11] Patent Number: 4,777,074
[45] Date of Patent: Oct. 11, 1988

[54] GROOVED MAGNETIC SUBSTRATES AND METHOD FOR PRODUCING THE SAME

[75] Inventors: Toshiaki Wada, Takatsuki; Yoshiaki Katsuyama, Muro; Junichi Nakaoka, Amagasaki, all of Japan

[73] Assignee: Sumitomo Special Metals Co., Ltd., Osaka, Japan

[21] Appl. No.: 888,873

[22] Filed: Jul. 24, 1986

[30] Foreign Application Priority Data

Aug. 12, 1985 [JP] Japan ................................. 60-177430
Aug. 26, 1985 [JP] Japan ................................. 60-188175

[51] Int. Cl.$^4$ ............................................. G11B 5/42
[52] U.S. Cl. .......................................... 428/156; 29/603;
204/192.22; 360/110; 360/122; 427/129;
428/163; 428/472; 428/472.2; 428/694;
428/900
[58] Field of Search ................... 428/692, 693, D 900,
428/156, 163, 694, 472; 360/110, 125, 126, 119,
122, 120, 121; 346/74.2, 74.5; 427/129, 130;
204/192.22; 29/603

[56] References Cited

U.S. PATENT DOCUMENTS

| | | | |
|---|---|---|---|
| 4,422,117 | 12/1983 | Nomura | 360/126 |
| 4,588,654 | 5/1986 | Kobuke | 428/626 |
| 4,598,052 | 7/1986 | Wada et al. | 501/87 |
| 4,608,293 | 8/1986 | Wada | 428/141 |
| 4,656,547 | 4/1987 | Kumasaka et al. | 360/122 |
| 4,659,606 | 4/1987 | Wada et al. | 428/141 |
| 4,690,846 | 9/1987 | Wada et al. | 428/64 |

Primary Examiner—George F. Lesmes
Assistant Examiner—James B. Monroe
Attorney, Agent, or Firm—Burns, Doane, Swecker & Mathis

[57] ABSTRACT

A grooved magnetic substrate including an alumina film layer having a Knoop hardness of 600 kg/mm$^2$ to 1200 kg/mm$^2$ charged in at least one groove formed in a surface of a magnetic substrate. The magnetic substrate may be Mn-Zn or NiZn base ferrite. The alumina film layer is formed by sputtering.

6 Claims, 2 Drawing Sheets

GROOVED MAGNETIC SUBSTRATES AND METHOD FOR PRODUCING THE SAME

BACKGROUND OF THE INVENTION

This invention relates to a grooved magnetic substrate for thin film magnetic heads such as, for instance, vertical magnetic heads, MR element magnetic heads or inductance magnetic heads and a method for producing such a substrate. More particularly, this invention relates to a magnetic substrate of a grooved structure wherein a groove formed in a substrate is filled with a nonmagnetic layer.

Recently, thin film magnetic heads are being put to practical use, and are known to have electro-magnetic conversion properties higher than, by one digit or more, those of conventional magnetic heads prepared by using soft ferrite blocks as the starting materials. In order to improve the properties of such thin film magnetic heads, it has been also proposed to provide a stepped structure in the cross-sectional shape thereof.

However, since thin film heads of stepped structure show a low strength with respect to the sliding movement of magnetic recording media, it has been proposed to provide thin film magnetic heads using magnetic substrates having therein a groove filled with a non-magnetic layer, whereby the distance between the opposite poles is magnetically increased, and the substrate is physically or geometrically of a planar surface. In general, glass has been used as the non-magnetic layer.

In order to embed glass into the surface of a magnetic substrate such as Mn-Zn ferrite, Ni-Zn ferrite or the like in the groove form, there is a process wherein plate-like glass is placed in at least one groove formed in a surface of such a magnetic substrate, and is heated to a temperature at which a glass viscosity reaches $10^4$–$10^5$ poise, thereby to form a non-magnetic layer to fill the groove. However, such a process offers problems in that pores easily appear in the formed glass layer, and, when Mn-Zn ferrite is used as the magnetic substrate, an interdiffusion layer of the substrate components and glass components is formed in a region where they come into contact with each other.

In the preparation of thin film magnetic heads, a glass layer is formed on a substrate, and thereafter, several kinds of thin films constituting a magnetic circuit are formed on the precision-finished glass layer by means of IC technology. However, if pores are produced in that layer, the exposed pores will lead to disconnection or poor insulation of the magnetic circuit and a variation in magnetic properties. In addition, the yield of head products will also be dependent largely upon the number of pores, thus offering a grave problem in view of quality control.

An apex point defining the boundary between the substrate of the groove portion and the glass layer in the magnetic circuit of the thin film head provides a reference point, when determining the gap depth of the thin film head. The input and output powers of the head are largely affected by this gap depth. However, there is a variation in the location of the apex point according to the thickness of the interdiffusion layer formed on the contact surface between the groove portion of the substrate and the glass layer. Such a variation leads to a problem that it fluctuates the gap depth with the resulting variation in the resultant electromagnetic properties.

With a view of providing a magnetic substrate for a grooved structure wherein the number of pores of glass charged in a groove in the substrate is prominently decreased, and the amount of an interdiffusion layer between the magnetic substrate and the glass is reduced, the present applicant has already proposed to prepare a grooved magnetic substrate by filling, under a given load, at least one groove formed in a surface of a magnetic substrate with glass heated to a temperature at which said glass has a glass viscosity of $10^6$ poise to $10^8$ pose and, thereafter, subjecting said magnetic substrate to hot isostatic pressing at or below a temperature at which the glass viscosity of said glass is $10^6$ poise (Japanese Patent Kokai Publication No. 59-203213 which corresponds to U.S. Pat. No. 4,636,420).

SUMMARY OF THE DISCLOSURE

In the products disclosed in the aforesaid Kokai Publication, however, there is also a fear that some reaction layers may be formed on the contact surface between the charged glass and the magnetic substrate, resulting in deterioration in the magnetic properties thereof. Besides, there is much to be required in respect of the fact that, when applying surface precision machining, the glass portion may be dented by lapping, so that there may be deterioration in the magnetic properties at the time of forming an upper magnetic core.

A primary object of the present invention is to provide a grooved magnetic substrate which further improves the electromagnetic properties of thin film head products and reduces variations in the quality thereof.

Another object of the present invention is to provide a grooved magnetic substrate wherein the occurrence of an interdiffusion layer of the thin film charged in the groove in the magnetic substrate and the substrate component is reduced to the extremity, and the occurrence of a step-like surface irregularity is reduced as much as possible, when it is subjected to precision machining.

A further object of the present invention is to provide a method for producing the aforesaid grooved magnetic substrates.

The present invention provides a grooved substrate wherein a groove formed in a substrate is filled with an alumina sputtered layer having a specific hardness to reduce the occurrence of an interdiffusion layer between the substrate and the alumina sputtered film and suppress the occurrence of a step-like surface irregularity at the time of surface precision machining to the extremity.

More specifically, according to the first aspect of the present invention, there is provided a grooved magnetic substrate characterized in that at least one groove formed in a surface of a magnetic substrate is filled with an alumina film layer having a Knoop hardness of 600–1200 kg/mm$^2$.

According to the second aspect of the present invention, there is provided a method for producing grooved magnetic substrates characterized by including the steps of (a) depositing alumina particles into at least one groove formed in a surface of a magnetic substrate by means of sputtering to form an alumina film layer, and (b) applying precision machining to the alumina film layer in such a manner that said groove is exposed, thereby forming an alumina film layer having a Knoop hardness of 600 to 1200 kg/mm$^2$ to fill said groove therewith.

According to the third aspect of the present invention, a heat-treatment step (c) is additionally applied following the alumina thin film-forming step (a) to enhance the hardness of the film to a predetermined hardness value.

DESCRIPTION OF THE PREFERRED EMBODIMENTS

Figure 1:
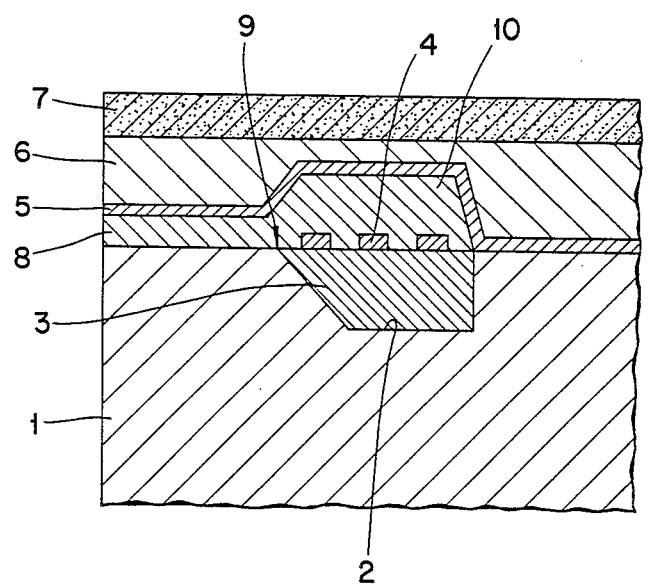
FIG. 1 is a view illustrating one embodiment of the thin film magnetic head according to the present invention.

According to the first aspect, the alumina film layer is preferably a sputtered layer with respect to its dense nature, hardness and productivity. However, known vapor deposition techniques for alumina thin film deposition are not excluded.

Preferably, sputtering is carried out by discharging an Ar gas or a mixed gas of an Ar gas with an $O_2$ gas introduced in a vacuum vessel by means of a sputter power source and accelerating the thus ionized gas by an electric field to allow it to collide with a target composed of an alumina material and release alumina particles (or clusters) therefrom, which are in turn deposited onto a surface portion of a magnetic substrate including the inside of a groove.

In the present invention, the reason for charging and forming an alumina sputtered film having a specific hardness into at least one groove formed in a surface of a magnetic substrate is that the hardness of the alumina film located within the groove is required to be equal to or higher than that of a soft ferrite material constituting the magnetic substrate. This alumina film is non-magnetic and stable in chemistry, and can act as an insulator (which means that any separate insulating layer is unnecessary), and has another advantage that it shows firm bonding with respect to the soft ferrite material.

In the process of the present invention, sputtering is applied to charge alumina into the groove. One reason therefor is that sputtering does not need such high-temperature treatment of 2000° C. or higher as required in the alumina fushing technique, thereby preventing the magnetic properties of soft ferrite from deteriorating and forming a thin film which is less defective, for instance, has a reduced number of pores. Another reason, as will be described later, is that the hardness of the alumina thin film can be adjusted to the required value by the application of sputtering under the novel conditions found by the present inventors.

The hardness of Mn-Zn ferrite, of which a magnetic substrate may be formed, is about 700 kg/mm² in terms of Knoop hardness, and that of Ni-Zn ferrite is about 800 kg/mm². It is thus required that the alumina sputtered film charged into the groove in the surface of the magnetic substrate have a specific hardness in order to reduce its step-like surface irregularity relative to the ferrite substrate as much as possible (to 200 Å or less), when applying precision machining thereto in the later step.

In the present invention, it is unpreferred that the alumina sputtered film has a hardness represented by a Knoop hardness of below 600 kg/mm², since the surface irregularity of the alumina film with respect to the ferrite substrate exceeds 200 Å. It is also unpreferred that the alumina sputtered film has a hardness exceeding 1200 kg/mm², since the hardness of the alumina film exceeds that of the ferrite substrate with the result that a step-like surface irregularity of 200 Å or higher is rather brought about. This is the reason why the Knoop hardness of the alumina sputtered film is limited to a range of 600 kg/mm² to 1200 kg/mm².

For a Mn-Zn ferrite base magnetic substrate, it is preferred that the alumina sputtered film has a Knoop hardness 600 kg/mm² to 1000 kg/mm², and for a Ni-Zn ferrite base magnetic substrate, it is preferred that the alumina sputtered film has a Knoop hardness of 700 kg/mm² to 1200 kg/mm².

According to the present invention, it has been found that the hardness of the alumina film to be sputtered can be adjusted to the required value depending upon the nature of soft ferrite constituting the magnetic substrate by proper selection of the partial pressure of $O_2$ in an Ar atmosphere introduced into a vacuum vessel and the amount of a negative bias voltage applied on the substrate, which is applied additionally to the sputtering voltage.

Figure 2:
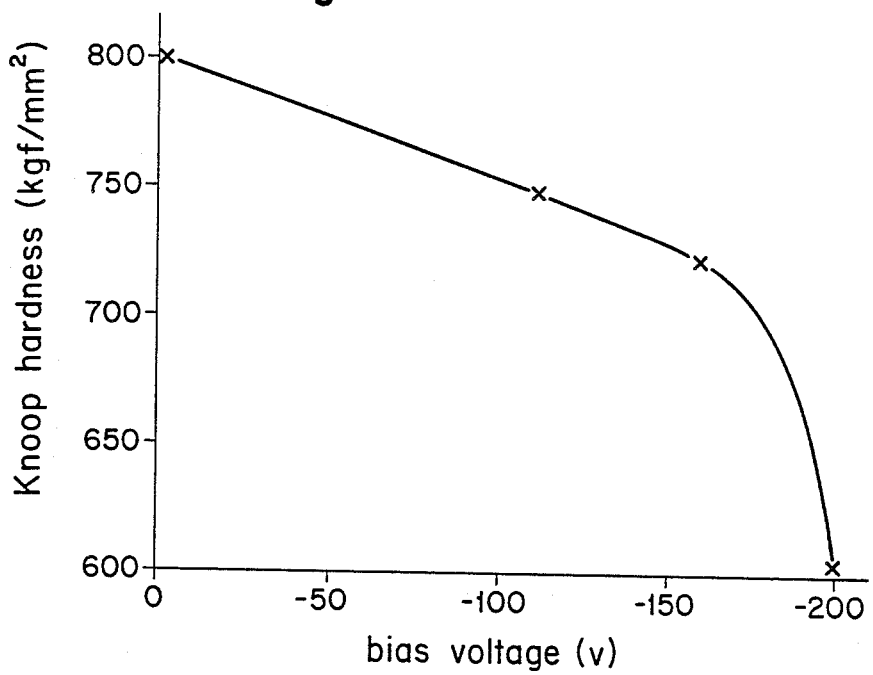
FIG. 2 is a graph showing the relationship between the bias voltage and the Knoop hardness during sputtering.

Referring more specifically to the hardness of an alumina sputtered film obtained when sputtering is carried out at a bias voltage of 0 to $-200$ V which is applied under the conditions that the sputtering power is 5.5 kW and the pressure of an Ar gas prevailing in an Ar gas-substituted, closed vessel is $2 \times 10^{-2}$ Torr, it varies depending upon the bias voltage impressed, as illustrated in FIG. 2. It is thus required to select the bias voltage from a range of 0 to $-200$ V so as to obtain an alumina thin film having the required hardness. A bias voltage exceeding $-200$ V is unpreferred, since the film hardness drops, the step-like surface irregularity increases upon processing, and the efficiency of sputtering drops.

Figure 3:
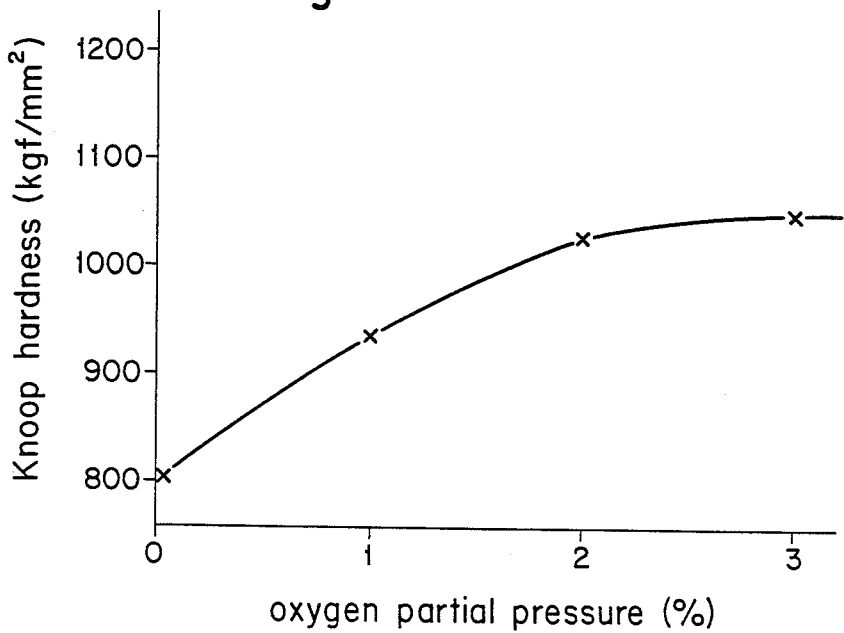
FIG. 3 is a graph showing the relationship between the partial pressure of oxygen and the Knoop hardness.

Turning to the partial pressure of $O_2$ in the air Ar atmosphere, the hardness of the sputtered film increases with increases in the partial pressure of $O_2$, as shown in FIG. 3. In the present invention, the partial pressure of $O_2$ is required to be 3% or less.

The partial pressure of $O_2$ in the Ar atmosphere exceeding 3% is unpreferred, since the effect upon increases in hardness is saturated, and the internal stress of the alumina film is so increased that the substrate may suffer fracture. There is also a drop in the efficiency of sputtering.

Preferably, alumina, which is a target material used for sputtering, should have a purity of 90 weight % or higher. When alumina has a purity of below 90%, there occur defects in the deposited film due to abnormal discharge, which are the cause for the occurrence of abnormal sputtering in association with fluctuations in the efficiency of sputtering.

According to the third aspect of the present invention, the heat-treatment step (c) is additionally applied following the step (a) of forming the alumina sputtered thin film in at least one groove formed in the surface of the substrate. This step is provided to release the Ar gas from the region within the alumina thin film and supply $O_2$ to the oxide of the film. By carrying out the heat treatment in air, it is possible to obtain a film having an increased hardness. For instance, it is possible to achieve an increase by about 20% in hardness by carrying out heat treatment at 500° C. for 1 hour in air. Preferred heat-treatment conditions are 400°–600° C. and approximately 30 minutes to 2 hours.

Reference will now be concretely explained to the method for producing grooved magnetic substrates according to the 2nd and 3rd aspects of the present invention.

First of all, a groove 2 is formed in a magnetic substrate 1 by mechanical, photoetching or like manner, as shown in FIG. 1 which is a sectional view of one embodiment of the thin film magnetic head according to the present invention.

Alumina is then sputtered so as to be deposited in the groove 2. According to the sputtering process used in the present invention, an alumina material of 90weight % or higher purity to be sputtered is used as a cathodic target material, and the aforesaid magnetic substrate 1 having at least one groove in its surface is used as an anode in an argon atmosphere of a reduced pressure, in which the partial pressure of $O_2$ is adjusted to 3% or lower. A sputtering voltage, to which a bias voltage of 0 to $-120$ V is additionally imposed, is applied at least between the two electrodes to ionize the gas in the atmosphere. The resulting anions are accelerated by an electric field, and are then allowed to collide with the surface of the cathodic target material with a large kinetic energy for cathodic sputtering of the surface atoms or molecules (clusters). The thus energized-out alumina particles are deposited onto the surface of the anodic magnetic substrate to form an alumina thin film thereon.

In the case of the 3rd aspect of the present invention, the resulting product is then heat-treated in air. Thus an alumina sputtered film layer 3 having a Knoop hardness of of 600 to 1200 kg/mm$^2$ is formed onto a surface portion of the magnetic substrate 1 including the groove 2. Subsequently, a portion of the alumina sputtered film layer 3 thus deposited is removed by precision machining with a diamond abrasive machining, a mechanochemical polishing or the like manner in such a manner that the groove 2 is exposed to air, thereby obtaining the inventive magnetic substrate having a surface roughness of 100 Å or lower and a step-like surface irregularity of the alumina film relative to the substrate being 200 Å or lower, wherein the alumina sputtered film layer 3 having a Knoop hardness of 600 to 1200 kg/mm$^2$ is charged in the groove 2.

In the grooved magnetic substrate 1 obtained according to the present invention invention, the alumina sputtered film layer in the groove 2 contains no pores, and the interdiffusion layer of the film 3 and the substrate is reduced as much as possible.

Furthermore, the magnetic substrate 1 is precision-polished to a plane on the surface including the alumina sputtered film layer 3, and an electrically conductive layer 4, an insulating layer 10, a magnetic layer 5, a low-melting glass layer 6 and a non-magnetic coating 7 are deposited onto the substrate 1 and the layer 3 by suitable thin film-forming manners generally such as sputtering, vapor deposition or the like to form a thin film pattern. In this manner, a thin film magnetic head is prepared. It is to be noted that reference numerals 8 and 9 stand for a gap portion and an apex point, respectively.

For sputtering in the present invention, use may be made of dipole sputtering or bias sputtering, alternate sputterings such as asymmetric alternate sputtering high-frequency sputtering, and getter sputtering. The target material used for sputtering and the alumina material charged in the groove may have a purity of 90 weight % or higher.

In the present invention, at least one groove to be formed in the magnetic substrate should preferably have a depth of 50 to 50 micrometers. This is because an economical problem arises at a depth exceeding 50 micrometers, while another problem arises in connection with machining precision at a depth of below 5 micrometers. If a width (w) is larger than said depth (d), in other words, unless $0 < d/w < 1$ is satisfied, some voids are then formed in the alumina sputtered film.

The magnetic substrate used in the present invention may be formed of either one of soft Mn-Zn or Ni-Zn ferrite. Particularly good results are obtained, when the present invention is applied to a Mn-Zn ferrite substrate, since at an elevated temperature it reacts easily with oxygen, is chemically unstable, and reacts with the conventional glass component to easily form an interdiffusion layer on the surface of contact thereof with the glass.

EXAMPLES

The present invention will now be explained with reference to the examples thereof.

EXAMPLE 1 (3rd Aspect)

Three grooves, each measuring 0.15 mm (width)×0.03 mm (depth)×25 mm (length), were mechanically formed in a Mn-Zn ferrite substrate of 25 mm×25 mm×1 mm in size, which had been precision finished on the surface.

Thereafter, the Mn-Zn ferrite substrate was placed as an anode in a vacuum vessel having a degree of vacuum of $1\times10^{-6}$ Torr, in which an alumina plate having a purity of 99% was used as a cathodic target material, and an Ar gas was introduced to $2\times10^{-2}$ Torr. An electrical power of 5.5 kW, to which a bias voltage of $-50$ V was added, was impressed between the electrodes for discharging. Sputtering was then carried out for 15 hours to form on the surface of said substrate an alumina sputtered film having the same composition as the target material and a thickness of 40 micrometers.

The resulting product was further heat-treated at 500° C. for 1 hour in air. The alumina sputtered film had then a Knoop hardness of 850 kg/mm$^2$. A 15-micrometer portion of that film was removed by precision machining in such a manner that the groove was exposed to air. In this manner, a Mn-Zn ferrite magnetic substrate could be obtained, which had a surface roughness of 80 Å and in which the alumina sputtered film was charged in the groove.

In the resulting grooved magnetic substrate according to the present invention, the alumina sputtered film layer did not contain any pores having a size of 1 micrometer or larger.

For the purpose of comparison, the same substrate as mentioned above was formed therein with grooves, which were filled with high-melting point glass (soda lime base glass having a coefficient of thermal expansion of $93.5\times10^{-7}/°$ C., a softening point of 696° C. and a working point of 1005° C.) heated to a temperature at which the glass viscosity reached 10$^5$ poise, vis., 880° C. The resultant glass layers were found to contain therein pores having a size of 1 micrometer or larger with the number being 25 pores/mm$^3$ or higher.

A Mn-Zn ferrite magnetic substrate in which an alumina sputtered film having a Knoop hardness of 850 kg/mm$^2$ was charged in a groove according to the present invention and a Mn-Zn ferrite magnetic substrate in which a high-melting point glass having a Knoop hardness of 600 kg/mm² was charged for the purpose of comparison were polished and finished to a surface roughness of 50 Å at a lapping pressure of 0.2 kg/mm² and a lapping speed of 50 m/min. in a suspension obtained by suspending 3 wt % $SiO_2$ particles having a size of 70 Å in pure water by means of mechanochemical polishing with a Sn lapping plate. It was then noted that the step-like surface irregularity of the ferrite substrate relative to the alumina film was 100 Å in the magnetic substrate of the present invention, while that of the substrate relative to the glass film in the groove was 300 Å in the magnetic substrate provided for the purpose of comparison. That is, the step-like surface irregularity in the present invention is ⅓ or less of that in the comparison sample, which means that the present invention is very effective in improving the electromagnetic properties of a thin film magnetic head provided on the surface of the magnetic substrate.

EXAMPLE 2 (2nd Aspect)

Except that the heat treatment step was omitted, Example 1 was substantially repeated to obtain an alumina sputtered film having a hardness of 780 kgf/mm². Other results were also found to be satisfactory.

It should be understood that modifications apparent in the art may be done without departing from the gist of the present invention as hereinabove disclosed and claimed hereinbelow.

What is claimed is:

1. A grooved magnetic substrate including an alumina film layer charged in at least one groove formed in a surface of the magnetic substrate wherein a step-like surface irregularity between said magnetic substrate and said alumina film layer is 200 Å or lower, and
   wherein said groove in said magnetic substrate has a size expressed in terms of a depth (d) of 5 to 50 micrometers, and a ratio of depth (d) width (w) is 1 or lower, and
   wherein said alumina film layer has a Knoop hardness of 600 Kg/mn² to 1200 Kg/mn² which is equal to or higher than that of the magnetic substrate.

2. A grooved magnetic substrate as defined in claim 1, wherein said magnetic substrate comprises Mn-Zn or Ni-Zn base ferrite.

3. A grooved magnetic substrate as defined in claim 1, wherein said alumina film layer is a film layer formed by sputtering.

4. A grooved magnetic substrate as defined in claim 1, wherein said magnetic substrate is a Mn-Zn base ferrite, and said alumina film layer has a Knoop hardness of 600 kg/mm² to 1000 kg/mm².

5. A grooved magnetic substrate as defined in claim 1, wherein said magnetic substrate is a Ni-Zn base ferrite, and said alumina film layer has a Knoop hardness of 700 kg/mm² to 1200 kg/mm².

6. A grooved magnetic substrate as defined in claim 1, wherein said magnetic substrate has a surface roughness of 100 Å or lower.

* * * * *